United States Patent
Oster

[11] Patent Number: 6,090,296
[45] Date of Patent: Jul. 18, 2000

[54] METHOD AND APPARATUS FOR UV-OXIDATION OF TOXICS IN WATER AND UV-DISINFECTION OF WATER

[76] Inventor: Stephen P. Oster, 1625 Via Campagna, San Jose, Calif. 95120

[21] Appl. No.: 09/270,850

[22] Filed: Mar. 17, 1999

[51] Int. Cl.[7] .................... C02F 1/30; C02F 1/32
[52] U.S. Cl. .................. 210/748; 210/758; 210/199; 210/205; 422/21; 422/24; 250/428
[58] Field of Search .................. 210/748, 758, 210/764, 198.1, 199, 205; 422/21, 24, 186.3; 250/428

[56] References Cited

U.S. PATENT DOCUMENTS

| | | | |
|---|---|---|---|
| 3,634,025 | 1/1972 | Landry | 21/102 |
| 3,659,096 | 4/1972 | Kompanek | 250/43 |
| 3,819,516 | 6/1974 | Murchison et al. | 210/63 |
| 4,012,321 | 3/1977 | Koubek | 210/63 |
| 4,230,571 | 10/1980 | Dadd | 210/760 |
| 4,274,970 | 6/1981 | Beitzel | 210/748 |
| 4,764,278 | 8/1988 | Chou et al. | 210/634 |
| 4,836,929 | 6/1989 | Baumann et al. | 210/638 |
| 4,902,411 | 2/1990 | Lin | 210/104 |
| 4,906,387 | 3/1990 | Pisani | 210/748 |
| 4,913,827 | 4/1990 | Nebel | 210/748 |
| 4,969,991 | 11/1990 | Valadez | 210/96.2 |
| 4,983,307 | 1/1991 | Nesathurai | 210/748 |
| 4,990,260 | 2/1991 | Pisani | 210/664 |
| 5,006,233 | 4/1991 | Muisener | 210/96.1 |
| 5,045,288 | 9/1991 | Raupp et al. | 422/186.3 |
| 5,068,030 | 11/1991 | Chen | 210/95 |
| 5,073,256 | 12/1991 | Saito et al. | 210/638 |
| 5,087,374 | 2/1992 | Ding | 210/673 |
| 5,118,422 | 6/1992 | Cooper et al. | 210/636 |
| 5,120,450 | 6/1992 | Stanley, Jr. | 210/748 |
| 5,126,111 | 6/1992 | Al-Ekabi et al. | 422/186.3 |
| 5,151,174 | 9/1992 | Wiesmann | 210/97 |
| 5,174,898 | 12/1992 | Stuckmann et al. | 210/609 |
| 5,174,904 | 12/1992 | Smith, II | 210/748 |
| 5,178,755 | 1/1993 | LaCrosse | 210/195.1 |
| 5,178,758 | 1/1993 | Hwang | 210/256 |
| 5,180,499 | 1/1993 | Hinson et al. | 210/706 |
| 5,196,134 | 3/1993 | Jackson | 252/103 |
| 5,207,607 | 5/1993 | Dalton, III et al. | 210/143 |
| 5,217,921 | 6/1993 | Vincent | 210/704 |
| 5,227,053 | 7/1993 | Brym | 210/143 |
| 5,232,582 | 8/1993 | Takahashi et al. | 210/86 |
| 5,234,606 | 8/1993 | Kazama et al. | 210/748 |
| 5,236,595 | 8/1993 | Wang et al. | 210/669 |
| 5,247,178 | 9/1993 | Ury et al. | 250/438 |
| 5,254,246 | 10/1993 | Rivelli et al. | 210/195.4 |
| 5,256,299 | 10/1993 | Wang et al. | 210/664 |
| 5,258,124 | 11/1993 | Bolton et al. | 210/748 |
| 5,266,215 | 11/1993 | Engelhard | 210/748 |
| 5,296,850 | 3/1994 | King | 340/825.49 |
| 5,308,480 | 5/1994 | Hinson et al. | 210/195.1 |

(List continued on next page.)

*Primary Examiner*—David A. Simmons
*Assistant Examiner*—Betsey J. Morrison
*Attorney, Agent, or Firm*—Skjerven, Morrill, MacPherson, Franklin and Friel; Roberta P. Saxon

[57] ABSTRACT

A novel UV-oxidation and UV-disinfection system uses a highly-efficient, electrodeless microwave-excited lamp combined with a coaxial flow-through reactor design in which a liquid to be treated is pumped from the bottom of the reactor and flows vertically upward through a reactor vessel against gravity. A hydrogen peroxide solution is injected into the liquid to be treated and thoroughly mixed by an inline mixer just before the liquid enters the reactor vessel. The solution is irradiated during its entire passage through the reactor vessel by the lamp which is configured to evenly irradiate the entire cross section of the reactor vessel and which has a substantial part of its spectral output in the wavelength most effectively absorbed by hydrogen peroxide molecules. A method of using the coaxial flow-through reactor to destroy toxic chemicals in water is also provided. The reactor is also used for UV disinfection of water supplies. The system is scaleable to enable high-volume application. According to another embodiment of the present invention, two or three reactors are arranged serially such that the output of the first reactor is the input of the second reactor.

30 Claims, 7 Drawing Sheets

U.S. PATENT DOCUMENTS

| | | | |
|---|---|---|---|
| 5,330,661 | 7/1994 | Okuda et al. | 210/748 |
| 5,348,665 | 9/1994 | Schulte et al. | 210/748 |
| 5,376,281 | 12/1994 | Safta | 210/748 |
| 5,395,522 | 3/1995 | Melanson et al. | 210/202 |
| 5,466,367 | 11/1995 | Coate et al. | 210/96.1 |
| 5,466,425 | 11/1995 | Adams | 422/186.3 |
| 5,470,480 | 11/1995 | Gray et al. | 210/632 |
| 5,478,481 | 12/1995 | Kazama et al. | 210/748 |
| 5,494,576 | 2/1996 | Hoppe et al. | 210/198.1 |
| 5,505,856 | 4/1996 | Campen et al. | 210/668 |
| 5,507,951 | 4/1996 | French et al. | 210/631 |
| 5,512,178 | 4/1996 | Dempo | 210/638 |
| 5,536,400 | 7/1996 | Schultz | 210/192 |
| 5,545,316 | 8/1996 | Kazama et al. | 210/188 |
| 5,558,775 | 9/1996 | Busch, Jr. | 210/638 |
| 5,573,662 | 11/1996 | Abe et al. | 210/188 |
| 5,573,676 | 11/1996 | Massholder et al. | 210/759 |
| 5,582,741 | 12/1996 | Kenmoku et al. | 210/748 |
| 5,587,069 | 12/1996 | Downey et al. | 210/192 |
| 5,597,482 | 1/1997 | Melyon | 210/209 |
| 5,613,239 | 3/1997 | Obinata et al. | 588/1 |
| 5,614,151 | 3/1997 | LeVay et al. | 422/24 |
| 5,622,622 | 4/1997 | Johnson | 210/192 |
| 5,628,895 | 5/1997 | Zucholl | 210/85 |
| 5,635,059 | 6/1997 | Johnson | 210/192 |
| 5,653,877 | 8/1997 | Mark | 210/259 |
| 5,675,153 | 10/1997 | Snowball | 250/438 |
| 5,679,257 | 10/1997 | Coate et al. | 210/695 |
| 5,685,994 | 11/1997 | Johnson | 210/748 |
| 5,707,595 | 1/1998 | Weigold et al. | 422/186.3 |
| 5,709,799 | 1/1998 | Engelhard | 210/748 |
| 5,711,887 | 1/1998 | Gastman et al. | 210/748 |
| 5,747,387 | 5/1998 | Koizumi et al. | 438/708 |
| 5,765,403 | 6/1998 | Lincoln et al. | 68/13 R |
| 5,766,489 | 6/1998 | Weinzierl et al. | 210/748 |
| 5,780,860 | 7/1998 | Gadgil et al. | 250/432 |
| 5,785,845 | 7/1998 | Colaiano | 210/167 |
| 5,798,047 | 8/1998 | Takawa | 210/739 |

METHOD AND APPARATUS FOR UV-OXIDATION OF TOXICS IN WATER AND UV-DISINFECTION OF WATER

TECHNICAL FIELD

This invention relates generally to removal of toxic materials or pathogens from water and in particular to methods and apparatus for destruction of toxic organic chemicals or microorganisms in groundwater or treated effluent wastewater by ultraviolet oxidation.

BACKGROUND

The presence of toxic materials in surface and groundwater has been recognized as a problem of growing significance. Toxic chemicals are being detected in drinking water supplies, rendering them unusable. Most of the chemicals are organic chemicals that are relatively stable in the environment. Toxic removal from water poses economic and logistical challenges since the contaminants are usually present in low concentrations in a large volume of water. A number of technologies, including air stripping, carbon adsorption, and chemical oxidation, have been used for removal of toxic organics. Air stripping and activated carbon adsorption techniques have the disadvantage of concentrating the contaminants in a separate, usually solid, phase, which still requires further disposal.

In contrast, chemical oxidation is a destruction, as opposed to a transfer, process. In chemical oxidation, toxics are oxidized to non-toxic or less-toxic products. If complete reaction is achieved, termed complete mineralization, the final products of oxidation are carbon dioxide, water, and salts. UV-oxidation is an advanced oxidation process in which a strong oxidizing chemical, typically ozone or hydrogen peroxide, is added to the contaminated water and irradiated with ultraviolet (UV) light. For reasons of cost and practicality, hydrogen peroxide, conventionally termed peroxide, is generally the preferred oxidizer.

When hydrogen peroxide ($H_2O_2$) absorbs UV radiation, it breaks up (is photolyzed) into highly-reactive hydroxyl radicals (OH.) that react with and oxidize many organic chemical compounds. In conventional UV-oxidation systems, the source of UV radiation is typically an elongated tubular mercury vapor arc lamp excited by alternating current conducted between electrodes by a carrier gas, typically argon. In order to make use of all the radiation emitted by the lamps, typically the lamps are enclosed for protection in immersion wells made of quartz, a material that transmits UV light with minimal absorption, and immersed in a reactor vessel containing the water to be treated. An example of a typical system using immersed mercury arc lamps is described in U.S. Pat. No. 5,151,174 to Wiesmann.

UV radiation is also used without an oxidizer for disinfection of water as an alternative to chlorination. Immersion systems are typical, but other systems having a mercury arc lamp mounted external to the water have also been developed. In these systems, water flows through a chamber in a direction that is at a right angle to the UV radiation, or water flows through a transparent tube mounted in close proximity to the lamp.

UV-oxidation and UV-disinfection processes can be configured in batch or continuous-flow operations. For large-scale treatment facilities, continuous-flow configurations are desirable to achieve the high throughput required. However, in flow-through reactors, incoming solution is constantly mixing with treated solution, so there is always a chance that partially-treated solution can be output. Therefore, baffles or serpentine-shaped reaction chambers, for example, as in U.S. Pat. No. 3,634,025 to Landry, are often included in the reactors to channel the solution and increase residence time to ensure maximum exposure to UV radiation. Another example, U.S. Pat. No. 5,785, 845, to Colaiano, also describes such a reactor. In some implementations, ozone is used instead of hydrogen peroxide and is bubbled through the water to dissolve ozone in the water. The ozone molecule reacts with water molecules to form peroxide for photolysis by the UV radiation. Treatment methods using ozone are described, for example in U.S. Pat. No. 4,230,571 to Dadd and in U.S. Pat. No. 5,494,576 to Hoope et al. Other implementations have used chemical catalysts and require acidification of the water, as is the case in U.S. Pat. No. 3,819,516 to Murchison, et al.

While UV-oxidation is potentially a very attractive technology for treating contaminated groundwater because of the possibility of complete destruction of toxic chemicals, a number of drawbacks of the current systems have limited its widespread use. First, the energy used to power the UV radiation source may not be used efficiently in current systems because very little of the spectral output of conventional mercury arc lamps is in the short-wavelength range that is best absorbed by peroxide. This situation becomes even more pronounced at very low concentrations of peroxide, which would be used for treating waters with very low concentrations, less than 1 ppm, of organics. At the low levels of peroxide that would be used only the very short UV wavelengths are absorbed and utilized. Furthermore, multiple lamps in arrays are often needed to provide enough useful energy to achieve high throughput rates, and the lamps steadily degrade in output power and efficiency in continuous service. This combination has resulted in systems that are inefficient in terms of the amount of toxics removed for the amount of energy input, resulting in higher overall cost when compared to transfer technologies such as carbon adsorption and air stripping. Second, the quartz immersion wells are costly, require replacement when used with high-power lamps, and easily become fouled with substances from the liquid being treated, which necessitates frequent cleaning that adds to the operating cost of the system. Between cleanings any fouling present reduces the transmission of UV radiation and further diminishes efficiency. A third drawback is that reactor designs tend to be complicated to accommodate arrays of lamps and to provide baffles or complicated flow patterns, which, as discussed above, are often needed to maximize residence time of the solution and exposure to UV radiation. Complexity increases capital cost and maintenance. The use of other reactants such as ozone, or catalysts such as Fenton's reagent is not practical for high-volume operations due to cost.

In typical high-volume UV water disinfection applications, very large arrays, often containing thousands of conventional mercury arc lamps, are used. These arrays can weigh several tons. The water flows through the array, around immersed lamps. As the lamps age, their UV output diminishes steadily, resulting in substantial gradations of effectiveness throughout the array. For this reason it is not possible to ensure that all of the water is exposed to the same amount of UV energy and is treated sufficiently. Thus systems typically have a tolerance level for output quality, allowing a specified level of live bacteria to still be present in treated water. Such systems are expensive to build, difficult and expensive to maintain, and consume large amounts of electrical energy. For example, 700 kilowatts for a system that is capable of disinfecting 1 million gallons per day is typical. Because the lamp arrays are very large and massive, it is not practical to shut down the system to remove the array from the reactor and change individual lamps. In some systems all lamps are replaced on a regular schedule at the same time, helping to ensure that there will be as few individual variations in output as reasonably possible. Total replacement is, however, an expensive solution.

In other water disinfection systems, a mercury arc lamp is mounted to the side of a quartz tube through which water flows, as in U.S. Pat. No. 4,274,970, to Beitzel. In these systems, it is very difficult to ensure that all of the water is exposed to UV equally or sufficiently due to the uneven distribution of UV radiation. Therefore, a slow flow rate, resulting in a long residence time, is necessary in these systems.

What is needed is a way to utilize ultraviolet radiation for UV-oxidation or UV-disinfection of water that assures even exposure of the water to the radiation. Furthermore, what is needed is a UV light source that uses energy more efficiently than the sources commonly employed and a reactor design that avoids complications such as quartz immersion wells and baffles or serpentine chambers. It would be desirable to provide a UV-oxidation or UV-disinfection system that is more efficient to build and operate than the current technologies. Further, it would be desirable for the system to be scaleable so that the benefits of UV-oxidation and UV-disinfection can be realized in practice for high-volume water treatment applications.

SUMMARY

A novel UV-oxidation or UV-disinfection system uses a highly-efficient microwave-excited electrodeless lamp as a source of ultraviolet radiation combined with a simple coaxial flow-through reactor design. In the coaxial flow-through reactor, a liquid containing contaminants is pumped from the bottom of a reactor vessel and flows vertically upward through the reactor vessel against gravity. The UV source is mounted above the reactor vessel such that the UV radiation is directed downward through the reactor vessel. The liquid flows through the reactor along the same axis as the UV radiation, that is the liquid flow and the UV radiation direction are coaxial.

A hydrogen peroxide solution is injected into the liquid being treated and thoroughly mixed by an inline mixer just before the liquid enters the reactor vessel. As the liquid reaches the top of the reactor it spills over the sides evenly into a containment vessel which surrounds the reactor vessel near the top. An outlet of the containment vessel allows the solution to flow out by gravity, from where it is input to a pump for distribution. The liquid is irradiated evenly during its entire passage through the reactor vessel.

In the coaxial flow-through reactor, the UV source is mounted external to the reactor vessel, eliminating the need for quartz wells. The reactor is simple, inexpensive to manufacture, and requires almost no maintenance. The UV source typically includes a bulb containing mercury vapor and other gases. The UV output of the electrodeless bulb diminishes very little over the lifetime of the bulb. A sufficient portion of the spectral output of the electrodeless mercury lamp is in the short wavelength range, less than 250 nm, most effectively absorbed by hydrogen peroxide. In typical configurations, the lamp includes an elliptical reflector and is configured to evenly irradiate the entire cross section of the reactor vessel, guaranteeing that all of the liquid receives adequate exposure to UV radiation.

A UV-oxidation method which uses the coaxial flow-through reactor to destroy toxic chemicals in water is also provided. A liquid containing toxic chemical contamination is mixed with a peroxide solution and continuously pumped through the coaxial flow-through reactor from the bottom of the reactor vessel while simultaneously being irradiated from the UV source directed downward through the reactor vessel. An excess of peroxide between about 20 times and about 80 times the weight of contaminants in the liquid is used. The coaxial flow-through reactor and UV-oxidation method are readily scaleable by adjusting the power of the UV source and the speed at which the liquid is pumped through the reactor.

In an alternative configuration, the coaxial flow-through reactor is used for UV-oxidation in either a flow-through or a batch mode. In an additional alternative configuration, a recirculating reactor system includes a coaxial flow-through reactor and a holding tank arranged so that treated solution from the output of the reactor passes through the holding tank and back through the reactor. The recirculating reactor system is advantageously used to treat industrial wastewater that may contain toxic organic contaminants at concentrations of several thousand ppm or higher.

According to another embodiment of the present invention, multiple reactors are arranged serially such that the output of the first reactor is the input of the second reactor. Two or more reactors are advantageously used in series. Use of multiple reactors can provide a higher level of destruction, faster than with a single unit, or can allow a faster pumping speed for the same level of treatment.

In yet another aspect of the invention, the coaxial flow-through reactor and method are used for UV-disinfection of water supplies. UV-disinfection of water supplies has the additional benefit of destroying any trace organic contaminants present in the water supply. An alternative reactor configuration for high-volume UV-disinfection of water supplies includes an extended-width reactor vessel with multiple UV sources mounted contiguously.

In yet another embodiment, the coaxial flow-through reactor also includes a second peroxide inlet port part way up the reactor vessel for injection of additional peroxide as the solution passes through the reactor vessel. Alternatively, the reactor also includes a cover at the top of the containment vessel and a gas outlet line to contain and remove volatile organic compounds that pass through the reactor vessel without being destroyed.

Thus the coaxial flow-through reactor design provides a reactor for UV-oxidation of toxic contaminants in water and UV-disinfection of water that is simple in design, uses energy efficiently, and evenly exposes the solution being treated to radiation. The reactor design is readily scalable for a variety of groundwater, water supply, and industrial wastewater treatment applications.

DETAILED DESCRIPTION

Figure 1:
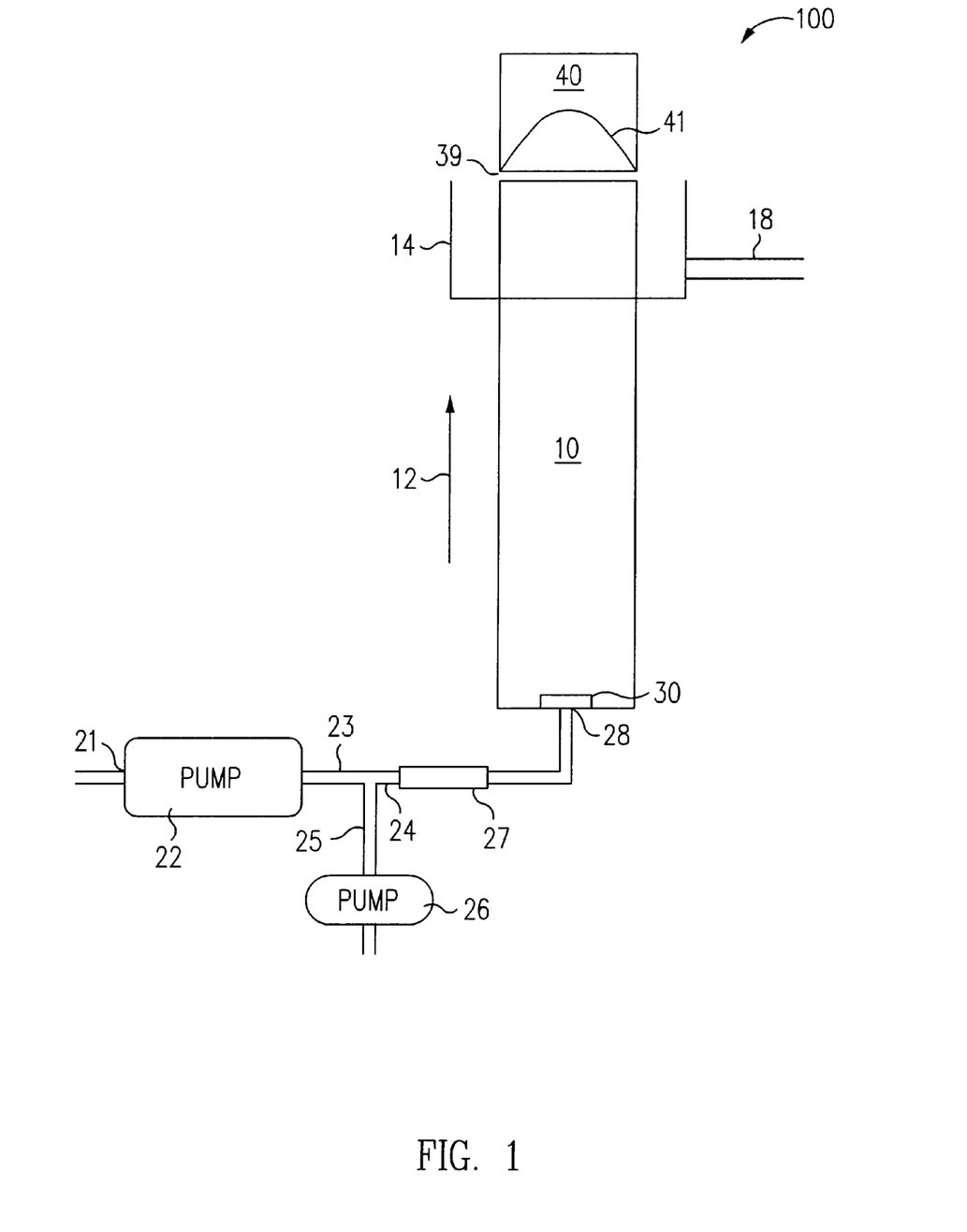
FIG. 1 is a schematic front view of coaxial flow-through reactor 100 according to an embodiment of the present invention.

A coaxial flow-through reactor for UV-oxidation of toxic chemicals in water and for UV-disinfection of water is shown schematically in FIG. 1. Reactor 100 includes a containment vessel 14 which surrounds the top part of a vertically-oriented reactor vessel 10. In the embodiment illustrated in FIG. 1, containment vessel 14 and reactor vessel 10 are both rectangular in cross section. A UV source 40 is positioned directly above containment vessel 14. A gap 39 is maintained between UV source 40 and reactor vessel 10 so that liquid is never in contact with UV source 40. As described in greater detail below, UV source 40 is optimized to illuminate the rectangular cross section of reactor vessel 10.

The solution to be treated is introduced into the bottom of reactor vessel 10. Specifically, the solution is introduced to a pump 22 via a pump inlet port 21. Pump 22 is typically a centrifugal pump. An inlet tube 23, which includes an inline mixer 27, connects pump 22 to a reactor inlet port 28 at the bottom of reactor vessel 10. Peroxide inflow 25 is connected to inlet tube 23 at peroxide port 24 positioned between pump 22 and inline mixer 27. A solution of hydrogen peroxide ($H_2O_2$) in water is introduced at peroxide port 24 through peroxide inflow 25 by a variable-rate peroxide pump 26. Peroxide pump 26 is typically a peristaltic pump. Alternative precision metering pumps known in the art can be used for peroxide pump 26 in place of a peristaltic pump. Inline mixer 27 is typically a passive device including a teflon-coated corkscrew-like insert that introduces turbulence into the liquid stream. A diffuser 30 in the bottom of reactor vessel 10 causes the incoming solution to spread evenly over the entire cross section of the reactor vessel.

The fluid flow induced by pump 22 causes the solution to flow upward in a direction 12 through reactor vessel 10 against the force of gravity. At the top of reactor vessel 10, the fluid flows over the edge of vessel 10 into containment vessel 14. Treated fluid flows out through an outlet line 18 by force of gravity. Alternatively, multiple output lines 18 are used to drain containment vessel 14 in order to enable higher flow rates. The UV radiation is directed downward through reactor vessel 10 in the direction parallel to direction 12. Hence, the UV radiation and the fluid flow are oriented co-axially. With this orientation, the peroxide-containing solution is exposed to UV radiation for its entire passage through the reactor. Furthermore, since the fluid is flowing against gravity, the residence time in the reactor is easily controlled by the pumping rate. Since the upwardly-flowing liquid appears to the UV source as a planar surface, all of the liquid is equally exposed and the possibility of some liquid escaping proper exposure is eliminated. At the top of the reactor, and just before spilling over the sides into the containment vessel, the water is evenly exposed to intense UV. This is especially advantageous for UV-disinfection of water because it guarantees that all of the water has been equally exposed and treated.

Figure 2A:
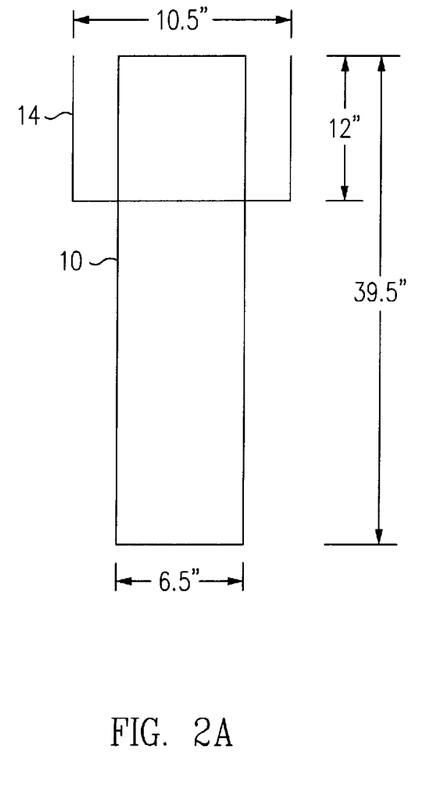
FIGS. 2A and 2B give the front view and side view dimensions of an approximately 5 gallon-size reactor 100 according to an embodiment of the present invention.
Figure 2B:
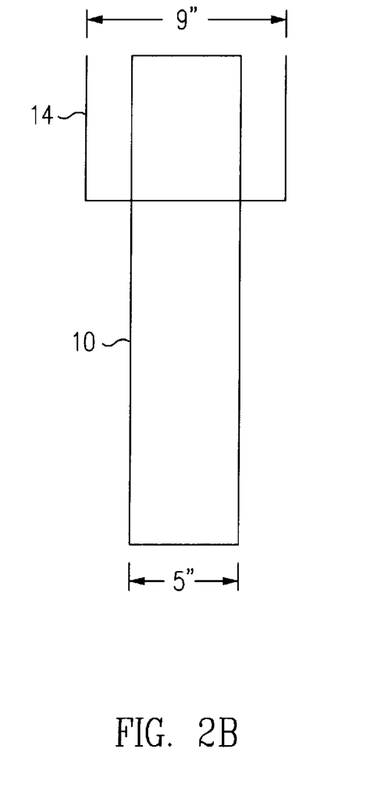

One example of reactor 100 in which reactor vessel 10 has approximately a 5-gallon capacity has the dimensions illustrated in FIGS. 2A and 2B. As can be seen from FIGS. 1, 2A, and 2B, the height of reactor vessel 10 is greater than its width or depth. Preferably the height is at least three times greater than the side dimensions. This geometry maximizes the residence time in the reactor for a given reactor vessel size. Reactor vessel 10 is preferably constructed of stainless steel. Inlet tube 23 and outlet line 18 are constructed of any material deemed safe for use with drinking water, or in the case of treatment of liquids with high concentrations of chemicals, any material that is not reactive with the subject chemicals.

UV source 40 is a microwave-excited electrodeless lamp such as the model F300, F450, or F600 mercury vapor lamp system manufactured by Fusion Curing Systems Corporation. In typical configurations, UV source 40 has a cylindrical bulb filled with a carrier gas such as argon and includes mercury vapor. A magnetron tube supplies microwave energy that excites the carrier gas and mercury atoms, resulting in a plasma that emits UV. By changing the gas composition or pressure in the bulb, and modifying other bulb parameters, the spectral output of the lamp can be modified. UV source 40 also includes a reflector 41 positioned over the bulb that is more than 90% efficient. Reflector 41 is typically elliptical in shape and provides approximately uniform illumination over a rectangular area the length of the cylindrical bulb and slightly less in width. The exact dimensions vary according to the lamp.

Hydrogen peroxide absorbs UV radiation most strongly in the 200 to 230 nm wavelength range, particularly when very low concentrations of peroxide are used (less than 100 ppm). Low or medium-pressure mercury arc lamps typically output nearly all of their UV energy at or above 254 nm, which is not optimal for $H_2O_2$ photolysis. In contrast, the electrodeless lamp, typified by the "H+" bulb provided by Fusion Systems, has about 8% of the total energy output below 242 nm, which is a much greater percentage at useful wavelengths than the output of typical mercury arc lamps. Thus, the electrodeless lamp provides a more effective and efficient UV source for the present UV-oxidation process than conventional lamps. Other electrodeless lamp arrangements, such as electrodeless lamps with spherically-shaped bulbs could alternatively be used.

While in principle a stoichiometric balance of peroxide and organic contaminants should allow all organic molecules to be reacted, in practice an excess of peroxide is desirable to increase the rate of reaction and allow higher throughput rates. Table 1 below lists experimentally-determined ratios of weight of peroxide to weight of organics (w/w) for typical UV-oxidation uses. At very low concentration of contaminants, a higher ratio of peroxide to organic contaminants is needed.

TABLE 1

Peroxide Ratios As Function Of Organic Concentration

| Concentration of Organics | Ratio of Peroxide to Organics (w/w) | Typical Application |
| --- | --- | --- |
| 500 ppb or less | 40 to 80 | Water supplies with very low concentrations of organics, disinfection of water, which may or may not have trace organics |
| 500 ppb to 10 ppm | 40 | Groundwater |

TABLE 1-continued

Peroxide Ratios As Function Of Organic Concentration

| Concentration of Organics | Ratio of Peroxide to Organics (w/w) | Typical Application |
| --- | --- | --- |
| 10 ppm to 100 ppm | 30 | Groundwater |
| 100 ppm and above | 20 | High-concentration industrial wastewater |

The use of reactor 100 to treat solutions of 1,318 ppm of phenol, 1 part per million (ppm) and 500 parts per billion (ppb) of methyl tertiary butyl ether (MTBE), and of 10 ppm isopropyl alcohol (IPA) is described below in Examples 1, 2, and 3, respectively, located at the end of this section. A ratio of peroxide concentration to MTBE concentration of 20 resulted in 90% MTBE oxidation in the 1 ppm solution and a ratio of 40 resulted in 95% oxidation in the 500 ppb solution.

A method of using reactor 100 to destroy toxic organic chemicals in a water solution is also provided. According to the method, the solution being treated is continuously pumped through reactor 100 by pump 22 while a peroxide solution is provided through peroxide inflow 25 and continuous UV radiation is provided by UV source 40. For a given concentration of organic contaminants in the solution the pumping speed of pump 22, the pumping speed of peroxide pump 26, and the concentration of peroxide in the peroxide solution is adjusted to give about the ratio of peroxide to organics listed in Table 1.

The coaxial flow-through reactor apparatus and method is readily scaleable by adjusting the power of UV source 40 and the pumping speed of pump 22. The pumping speed of pump 22 determines the residence time of the solution in reactor vessel 10. A higher power UV source 40 allows the reactor to be operated at a higher pumping speed. The same physical reactor unit could be used for a range of gallon-per-minute applications by changing the UV source. For groundwater clean-up and municipal water supply disinfection treatment, very high throughput is required.

Figure 3:
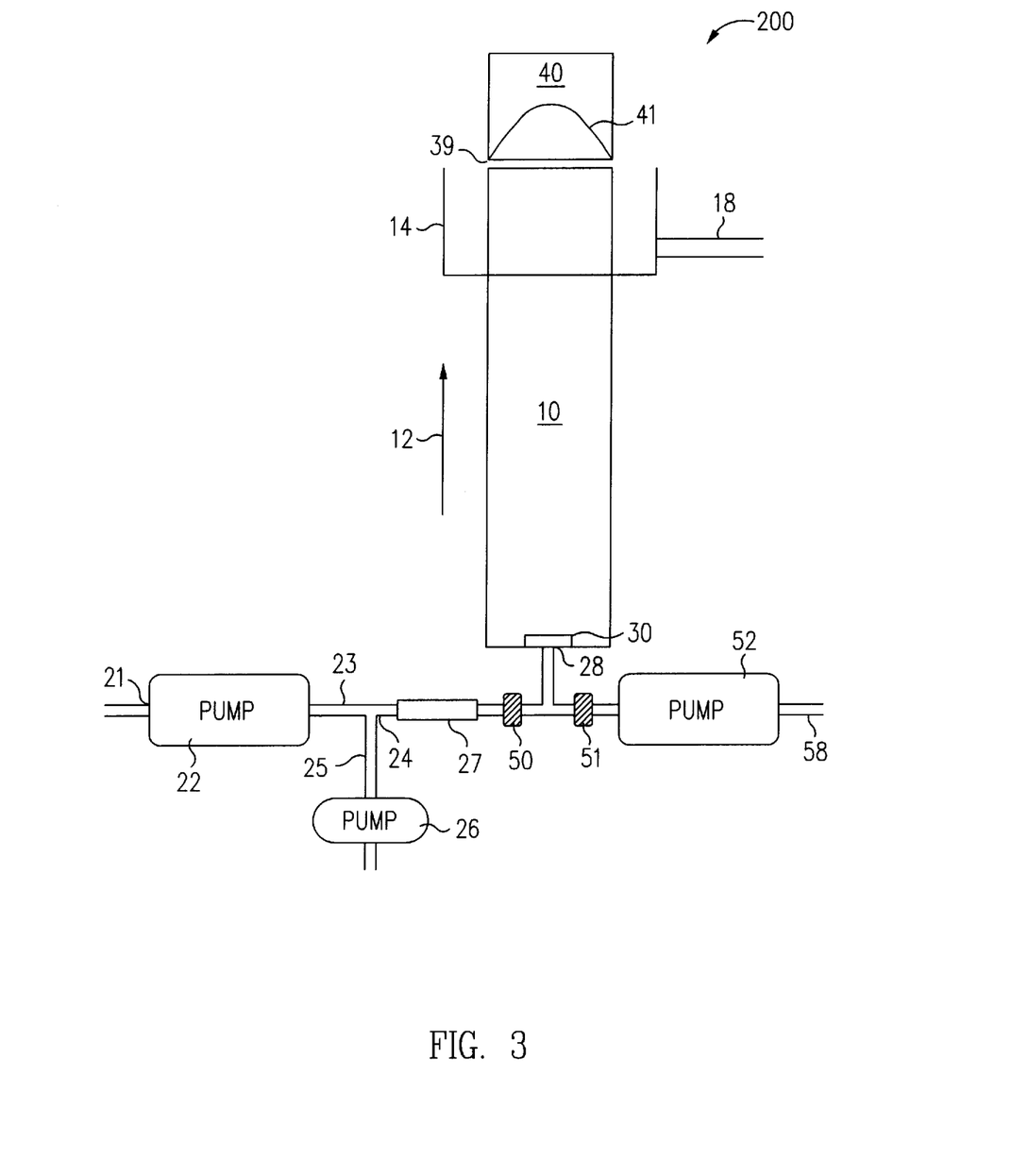
FIG. 3 is a schematic front view of reactor 200 that can be used in flow-through or in batch mode according to an embodiment of the present invention.

Reactor 200, illustrated in FIG. 3, is an alternative reactor configuration, which allows the same reactor to be used in either a flow-through or batch treatment mode. In reactor 200, reactor inlet tube 23 also includes two valves 50 and 51, a pump 52, similar in type to pump 22, and an outlet line 58. When the reactor is used in flow-through mode, as described above for reactor 100, valve 50 is open, valve 51 is closed, and only pump 22 operates. In batch-treatment mode, the valves are set as described above, peroxide solution is provided through peroxide port 24 and pump 22 is operated to fill the reactor. Then pump 22 is turned off and valve 50 is closed. UV source 40 is then turned on and the solution in the reactor is treated. At the conclusion of treatment, valve 51 is opened and pump 52 is turned on, discharging the treated solution through outlet line 58 to a holding tank, another treatment unit, or the sewer as appropriate. This reactor configuration is useful for general-purpose industrial wastewater treatment with high concentration (thousands of ppm) of organic compounds or mixtures of organics where either flow-through or batch-treatment method may be best for a particular waste stream.

Figure 4:
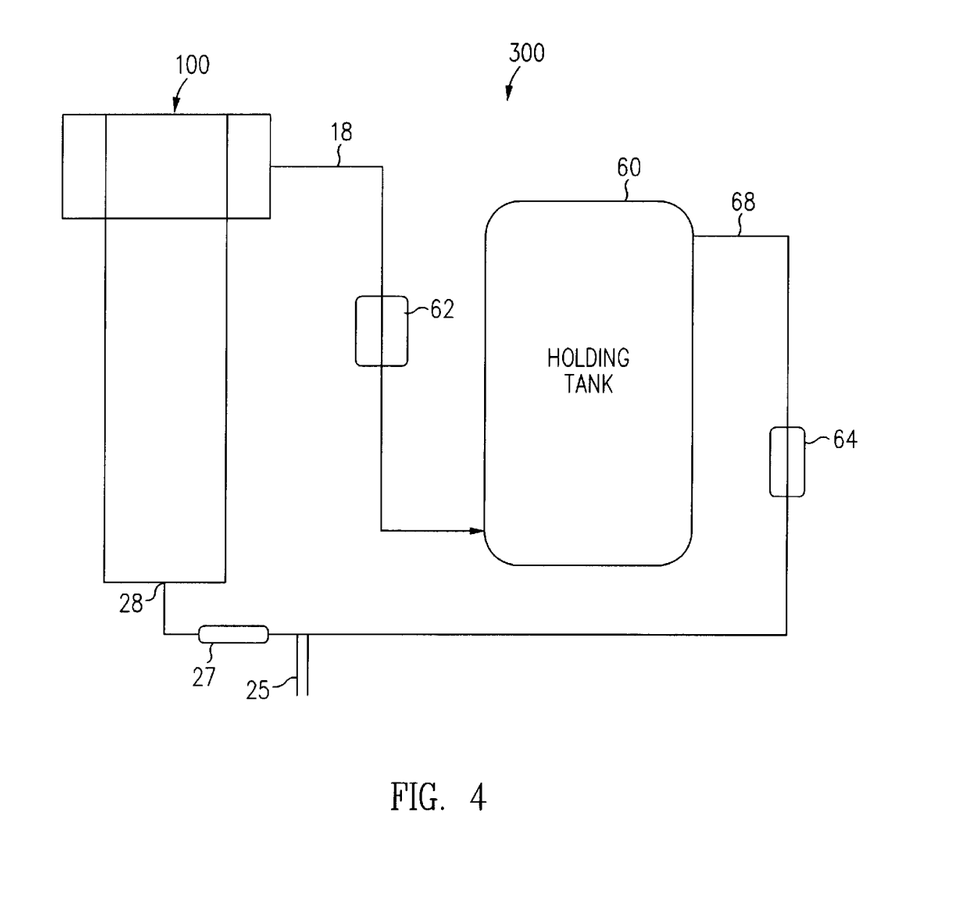
FIG. 4 is a schematic front view of recirculating reactor system 300 according to an embodiment of the present invention.

Another alternative configuration, recirculating reactor system 300 is illustrated schematically in FIG. 4. System 300 is advantageously used to remove toxic chemicals present at high concentrations, much higher than typically found in groundwater. Such solutions are industrial wastewaters that may contain toxic organics or mixtures of organics on the order of several thousand ppm or higher. In system 300, outlet line 18 of reactor 100 is connected to a holding tank 60. A pump 62 in outlet line 18 forces the solution which has passed through reactor 100 through holding tank 60. Outlet line 18 is connected to holding tank 60 at inlet port 65 near the bottom of holding tank 60. Outlet line 68 is connected to the top of holding tank 60 at one end and to reactor inlet port 28 of reactor 100 at the other end. Outlet line 68 also includes a pump 64 which pumps the solution past peroxide port 25 and through inline mixer 27. By operating pumps 62 and 64, the solution can be recirculated continuously until the concentration of contaminants is reduced to a predetermined level. The recirculating reactor system makes UV-oxidation practical for treatment of concentrated solutions, particularly those containing refractory organic compounds that are difficult to oxidize.

Figure 5:
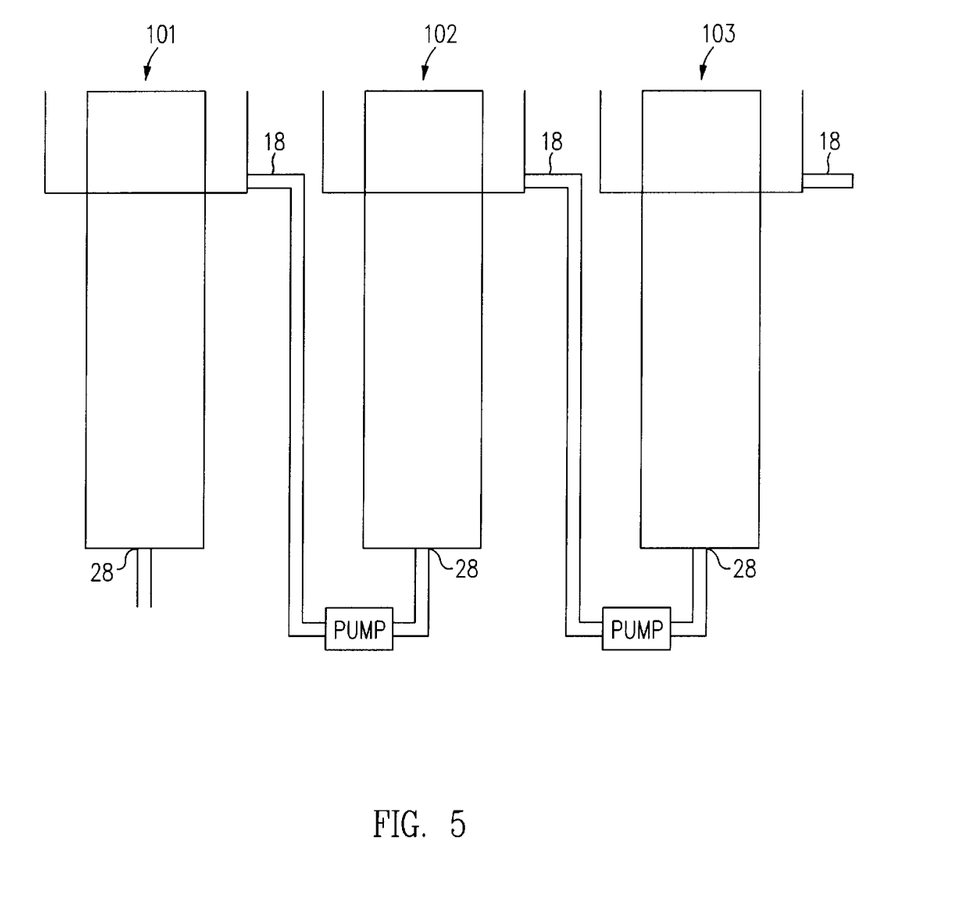
FIG. 5 illustrates multiple reactors configured in series according to an embodiment of the present invention.

In another aspect of the invention, multiple reactor units are used. The multiple reactor units can be configured in parallel such that inlet tube 23 is connected to multiple reactor units, each substantially like reactor 100. The parallel units operate at the same time, resulting in higher throughput than with a single unit. Alternatively, the reactor units are configured in series, as shown in FIG. 5, where the output of a first reactor unit 101 is pumped into a second substantially identical reactor unit 102 for further treatment. The output of the second reactor 102 is optionally injected into a third reactor unit 103. Using multiple reactor units in series can provide a higher level of destruction faster than treatment with a single unit. Alternatively, multiple reactor units are used to provide the same level of destruction as treatment with a single unit, but at a higher pumping speed, which results in higher throughput. While as many units as desired could be configured serially, typical series configurations include two or three reactor units.

In yet another aspect of the invention, the coaxial flow-through reactor and method are used for UV-disinfection of water supplies. Treatment of water supplies by exposure to UV radiation to denature any bacteria and microbes present is well known. The UV-oxidation method for destruction of toxic organics has the subsidiary benefit of combining the sterilizing power of UV with the oxidizing power of hydroxyl radicals, a more effective germicidal combination than UV radiation alone. A collateral benefit of UV-disinfection as a water supply treatment method is the oxidation of any trace toxics present. When reactor 100 is used strictly for disinfection, the method is the same as described above for destruction of toxics. The design of the reactor such that the water flows upward and appears to the UV source as a planar surface, particularly as it reaches the top of the reactor and exits ensures that all water will receive the same exposure to the UV before it exits the reactor. Even exposure to radiation is a particular advantage over previous methods of UV water disinfection. Because of the even exposure to UV radation, for certain water disinfection applications, reactor 100 is advantageously used for UV-disinfection by UV exposure alone without injection of peroxide.

Figure 6:
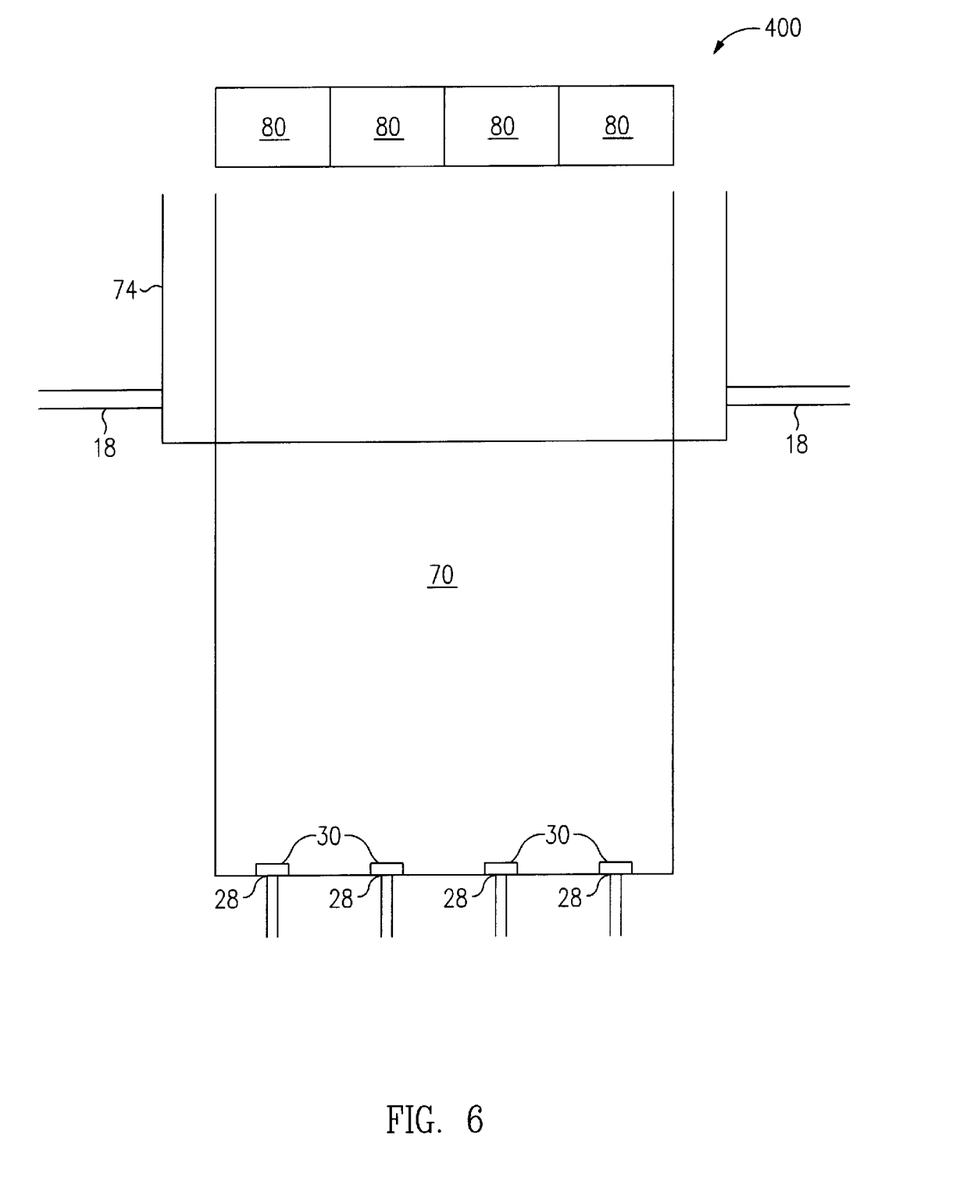
FIG. 6 is a schematic front view of reactor 400 including multiple UV sources for high-volume water treatment applications according to an embodiment of the present invention.

Another reactor variation, reactor 400, shown schematically in FIG. 6 is advantageously used for very high-volume water disinfection. Reactor 400 includes reactor vessel 70 and containment vessel 74, both with an extended width so that multiple UV sources 80 can be mounted contiguously to each other to provide continuous exposure to the water throughout the cross section of reactor vessel 70. A reactor inlet port 28 and diffuser 30 is provided directly below each UV source 80 to provide even continuous flow. One or more pumps, peroxide, inflows, and inline mixers, such as pump 22, peroxide inflow 25, and inline mixer 27 of reactor 100 are connected to the reactor inlet ports 28. Reactor 400 is used with or without peroxide, depending on the application.

UV source 80 can use lower-wattage lamps than those used by UV source 40 in reactor 100. UV source 80, therefore, can include lamp units that have a power supply mounted together with a reflector and housing all in one unit, lowering cost and simplifying maintenance. If a unit fails during operation it can be shut off, unmounted, and replaced with another unit in a few minutes, without shutting down the system. The physical size of reactor vessel 70 and the number of UV sources 80 determine the throughput of reactor 400 and provide scaleability. In one example of reactor 400, reactor vessel 70 is 80" wide, 8" deep, and 36" tall. Ten UV lamps of 800 watts each are mounted for a total energy input of 8 kW. The reactor of this example can be used to disinfect water at a rate of 100 gallons per minute.

Figure 7:
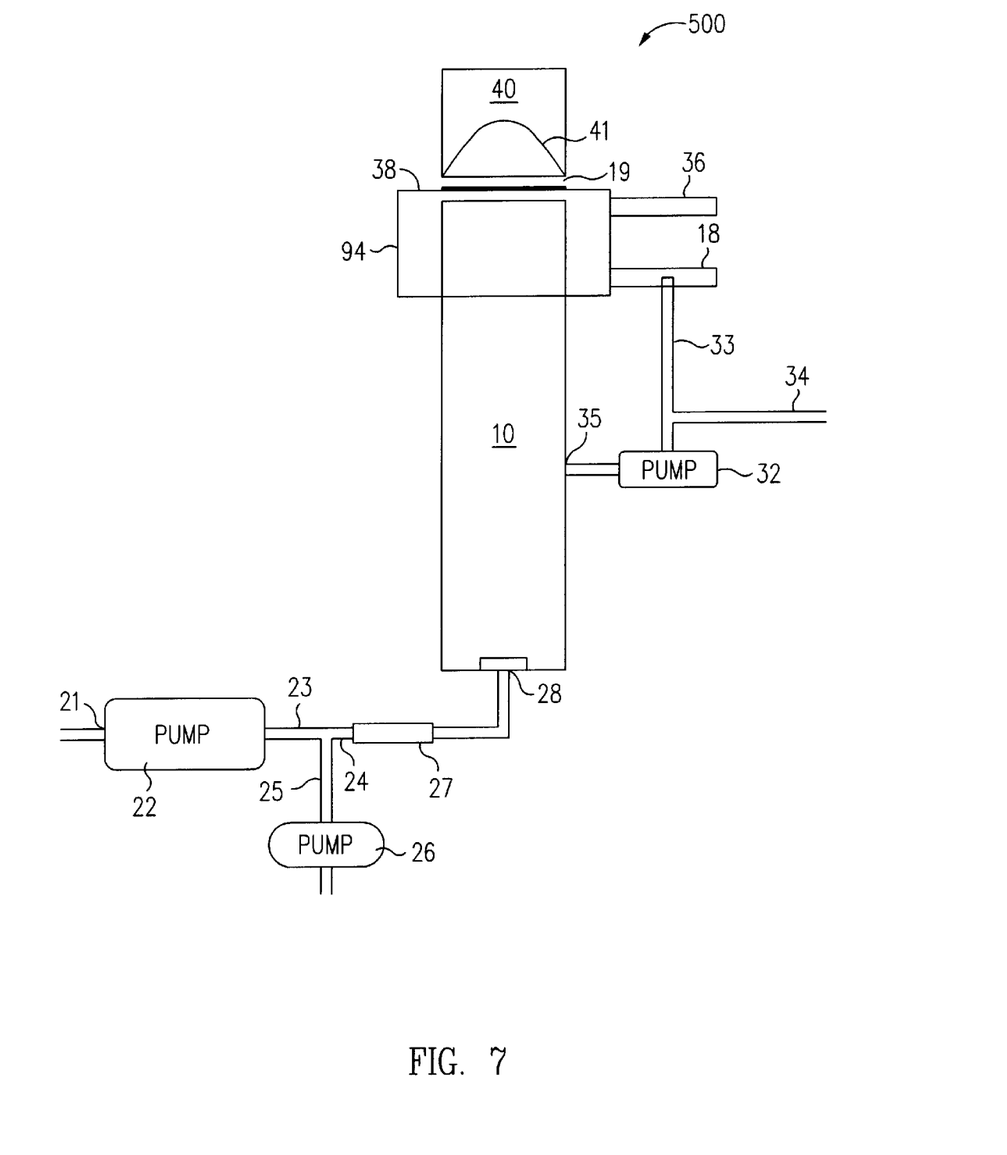
FIG. 7 is a schematic front view of reactor 500 including an auxiliary peroxide source and a cover and gas outlet line for containment of volatile organic compounds according to an alternative embodiment of the present invention.

In FIG. 7, yet another alternative reactor, coaxial flow-through reactor 500, is illustrated schematically. Reactor 500 includes a provision for injecting additional peroxide as the solution passes through the reactor vessel via an auxiliary peroxide inlet 35 on the side of reactor vessel 10. The peroxide is mixed with just-treated solution before being injected into the reactor. A small part of the treated solution is diverted from outlet line 18 into an extraction line 33, which includes a pump 32 and is connected to auxiliary peroxide inlet 35. A peroxide solution is provided to the extracted solution in extraction line 33 through an auxiliary peroxide inflow 34, which is connected to extraction line 33. Auxiliary peroxide inflow 34 is connected to a pump (not shown) such as peroxide pump 26 of reactor 100. The force of fluid flow provided by pump 32 results in mixing of the injected solution with the main body of solution flowing through the reactor in direction 12 without the use of stirrers or any other mechanism that would intrude into the reactor vessel and potentially block UV light or require maintenance. The purpose of selectively injecting this additional peroxide is to provide sufficient peroxide for a final "polishing" of the solution being treated, or removal of the final trace contaminants, just before the solution exits the reactor. Some of the very short-wavelength output of UV source 40 is absorbed by the water in the top few inches of the reactor, and therefore does not contribute to photolysis of the peroxide in the lower portion of the reactor. Injecting a small amount of peroxide into the liquid just before it exits the reactor allows the otherwise-wasted, highly-useful short-wavelengths to be absorbed and utilized.

Reactor 500 is also adapted to contain volatile organic chemicals (VOCs). Reactor 500 includes a cover 38 and a gas outlet line 36. In this design, a containment vessel 94 extends above the top of reactor vessel 10. For a reactor of the dimensions of FIGS. 2A and 2B, containment vessel 94 extends approximately two inches above the top of the reactor vessel 10. Containment vessel 94 is sealed at the top by cover 38. A UV transparent window made of quartz is installed in the center of cover 38 allowing UV radiation to pass through cover 38 and into reactor vessel 10. The treated solution has room to spill over the top of reactor vessel 10 and into containment vessel 94. The volatile compounds exit the chamber via gas outlet line 36 which is equipped with a conventional trap for collecting the VOCs (not shown). The compounds are then disposed of by conventional means. Additionally, the solution to be treated and the peroxide can be pumped into the reactor vessel in the vapor phase because reactor 500 provides containment. In many disinfection and groundwater treatment applications, the level of VOC emission will be low. Although reactor 500 shows both the auxiliary peroxide injection feature, elements 32–35, and the volatile organic handling feature, elements 36 and 38, either feature can be used independent of the other.

Although the invention has been described with reference to particular embodiments, the description is only an example of the invention's application and should not be taken as a limitation. Various adaptations and combinations of features of the embodiments disclosed are within the scope of the invention as defined by the claims appended following these Examples.

EXAMPLE 1

Oxidation of MTBE

Tap water (15 gallons) was combined with 56.8 mg of reagent MTBE to create a ~1 ppm solution. The Fusion Curing Systems model F300 lamp was turned on and the MTBE-contaminated solution was pumped through the reactor of FIGS. 2A and 2B, with a vessel capacity of 4.95 gal, at a rate of 2.18 gal/min while peroxide solution was injected at a rate of 0.62 mL/minute to provide 20 times the concentration by weight of MTBE. A sample was taken of the effluent water. The treated solution was passed through the reactor two more times following the same procedure.

A 500 ppb MTBE solution was prepared from 28.4 mg MTBE by the same procedure and treated as described above using the same concentration peroxide solution and injection rate (40 times the concentration by weight of the MTBE solution). A sample of the treated solution was taken after each pass through the reactor. All samples were analyzed using purge-and-trap gas chromatography.

TABLE 2

MTBE Oxidation Results

| Measured Concentration | 1 ppm solution (ppb) | 500 ppb solution (ppb) |
| --- | --- | --- |
| Initial value | 961 | 500* |
| First pass | 100 | 22 |
| Second pass | 31 | 17 |
| Third pass | 5 | 11 |

*Calculated, not measured value

The first-pass treatment of the 1 ppm solution corresponds to an oxidation rate of 380 ppb/min while the first pass treatment of the 500 ppm solution corresponds to an oxidation rate of 211 ppb/min. Note that both methods result in an MTBE concentration below the EPA standard for drinking water of 35 ppb.

EXAMPLE 2

Oxidation of Isopropyl Alcohol (IPA)

567.75 milligrams of 70% by weight Isopropyl Alcohol (IPA) was added to 15 gallons of tap water to make a ~10 ppm solution of IPA. Ten gallons of the solution was treated by pumping it through the reactor (flow-through mode), then the remaining 5 gallons was treated in the batch mode. Peroxide at a concentration of 20× the mass of the IPA was used. Results are shown in table 2.

TABLE 2

IPA Test Results

| Sample | Measured Concentration (ppm) |
| --- | --- |
| Initial value | 10.5 |
| Flow-through mode, 1 pass | 1.43 |
| Batch Mode, 136 seconds UV exposure | 1.91 |

EXAMPLE 3

Mineralization of Phenol

An experiment to demonstrate the reactor design in the application of treating an industrial wastewater stream contaminated with a high concentration of a toxic organic compound was conducted. Phenol was selected as the target organic because it has six carbon atoms per molecule. Phenol undergoes many stages of oxidation before complete mineralization, that is conversion to carbon dioxide and water, is achieved. Samples were analyzed by total organic carbon (TOC) analysis. Organic oxidation products of phenol produce the same carbon signature as phenol in TOC analysis. Carbon dioxide gas escapes the system and is not reflected in the TOC analysis. A solution with TOC of approximately 1000 ppm was prepared by adding 1.318 grams reagent phenol to each liter of tap water. The reactor was operated in the batch mode. Table 3 below lists results.

TABLE 3

Phenol Mineralization Test Results

| Sample | Measured TOC, ppm |
| --- | --- |
| Initial value | 1030 |
| 5 minutes UV exposure | 830 |
| 10 minutes UV exposure | 594 |
| 25 minutes UV exposure | 11 |
| 30 minutes UV exposure | 5 |

The results of Table 3 demonstrate that after 25 minutes of UV exposure, essentially complete mineralization of phenol was achieved.

I claim:

1. A reactor for treating a fluid comprising:

a reactor vessel through which fluid flows, the reactor vessel having a top, a bottom, and sides, and the reactor vessel being open at the top;

an inlet port in the reactor vessel, the inlet port positioned in the bottom of the reactor vessel;

a first pump connected via an inlet line to the inlet port, the first pump forcing the fluid in an upward direction through the reactor vessel;

a microwave-excited electrodeless lamp positioned proximate to but spaced above the top of the reactor vessel, the lamp providing ultraviolet radiation directed downward through the reactor vessel.

2. The reactor of claim 1 further comprising an oxidizer port in the inlet line interposed between the first pump and the inlet port, the oxidizer port for introducing an oxidizer.

3. The reactor of claim 2 further comprising an inline mixer in the inlet line interposed between the oxidizer port and the inlet port.

4. The reactor of claim 1 further comprising:

a containment vessel surrounding the top of the reactor vessel such that when the fluid forced by the pump reaches the top of the reactor vessel the fluid spills over the sides of the reactor vessel into the containment vessel; and a first outlet line attached to the containment vessel through which fluid flows out of the containment vessel by force of gravity.

5. The reactor of claim 4 further comprising:

a holding tank connected to the first outlet line; and a holding tank outlet line connected to the inlet port.

6. A reactor system comprising:

a first reactor according to claim 4; and a second reactor according to claim 4 wherein the first outlet line of the first reactor is connected to an inlet port of the second reactor.

7. The reactor of claim 4 further comprising:

a cover mounted on the top of the containment vessel, the cover containing a portion transparent to ultraviolet radiation; and a gas outlet line connected to the containment vessel at a position above the first outlet line, the gas outlet line for removing volatile compounds.

8. The reactor of claim 7 wherein the containment vessel is taller than the reactor vessel such that there is a space between the cover and the top of the reactor vessel.

9. The reactor of claim 4 further comprising:

a first valve in the inlet line positioned between the inline mixer and the inlet port;

a second outlet line including a second pump, the second outlet line connected to the inlet line at a position on the inlet line between the first valve and the inlet port; and a second valve on the second outlet line positioned between the second pump and the inlet line, whereby when the first pump is on, the first valve is open, and the second valve is closed, fluid is forced into the reactor vessel, and when the second pump is on, the first valve is closed and the second valve is open, fluid is drained out from the reactor vessel.

10. The reactor of claim 4 further comprising an auxiliary oxidizer port positioned intermediate between the top and the bottom of the reactor vessel.

11. The reactor of claim 10 further comprising:

an extraction line connected to the first outlet line and to the auxiliary oxidizer port;

an auxiliary pump in the extraction line; and an auxiliary oxidizer inflow connected to the extraction line at a position between the first outlet line and the auxiliary pump.

12. The reactor of claim 1 wherein the electrodeless lamp is a mercury vapor lamp comprising an elliptical reflector.

13. The reactor of claim 12 wherein the electrodeless lamp has at least 8% of its total UV spectral output at wavelengths shorter than 245 nm.

14. The reactor of claim 12 further comprising:

a plurality of electrode-less mercury vapor lamps mounted contiguously to one another;

a plurality of inlet ports in the bottom of the reactor vessel; and a plurality of diffusers, each diffuser mounted in the reactor vessel over one of the plurality of inlet ports.

15. The reactor of claim 1 further comprising a diffuser mounted in the reactor vessel directly over the inlet port.

16. The reactor of claim 1 wherein the distance between the top and the bottom of the reactor vessel is at least three times greater than the width of the sides of the reactor vessel.

17. A method for treating a solution comprising:

combining the solution with an oxidizer to form a first mixed solution;

passing the first mixed solution through a first reactor vessel from an inlet port in the first reactor vessel; and exposing the first mixed solution to ultraviolet radiation from a microwave-excited electrodeless lamp positioned proximate to but spaced from the first reactor vessel whereby the oxidizer forms active species that react with contaminants in the solution to form a treated solution.

18. The method of claim 17 wherein:

the inlet port is at the bottom of the reactor vessel and passing the first mixed solution is passing the first mixed solution vertically through the reactor vessel; and the electrodeless lamp is positioned above the top of the reactor vessel.

19. The method of claim 18 wherein the oxidizer is a solution of hydrogen peroxide and wherein exposing the mixed solution to ultraviolet radiation produces hydroxyl radicals.

20. The method of claim 19 wherein the weight of hydrogen peroxide in the first mixed solution is between about 20 and about 80 times the weight of contaminants in the first mixed solution.

21. The method of claim 20 wherein the contaminants of the solution comprise organic chemicals and wherein the hydroxyl radicals react with the organic chemicals to oxidize them.

22. The method of claim 18 further comprising:

collecting the treated solution in a containment vessel surrounding the top of the first reactor vessel; and removing the treated solution from the containment vessel in an outlet line.

23. The method of claim 22 further comprising:

pumping the treated solution from the outlet line into a holding tank; and passing the treated solution from the holding tank vertically through the first reactor vessel from the inlet port; and exposing the treated solution from the holding tank to the ultraviolet radiation.

24. The method of claim 18 further comprising;

mixing a portion of the treated solution in the outlet line with an oxidizer to form an auxiliary oxidizer solution; and injecting the auxiliary oxidizer solution into the reactor vessel at a position intermediate between the top and the bottom of the first reactor vessel.

25. The method of claim 18 further comprising:

combining the treated solution with an oxidizer to form a second mixed solution;

passing the second mixed solution vertically through a second reactor vessel from a port in the second reactor vessel at the bottom of the vessel; and simultaneously exposing the second mixed solution to ultraviolet radiation from a microwave-excited electrodeless lamp positioned proximate to but spaced from the top of the second reactor vessel.

26. A method for disinfecting water comprising:

passing the water vertically through a reactor vessel, the reactor vessel being open at the top, the water passing vertically upward through the reactor vessel from an inlet port positioned at the bottom of the reactor vessel; and exposing the water to ultraviolet radiation from a microwave-excited electrodeless lamp positioned proximate to but spaced above the top of the reactor vessel whereby the radiation denatures infective agents in the fluid.

27. The method of claim 26 further comprising injecting a solution containing hydrogen peroxide into the water before passing the water through the reactor vessel.

28. The method of claim 26 wherein exposing the water to ultraviolet radiation from a microwave-excited electrodeless lamp is exposing the water to ultraviolet radiation from a mercury vapor lamp comprising a reflector.

29. The method of claim 28 wherein exposing the water to ultraviolet radiation from a microwave-excited electrodeless lamp is exposing the water to ultraviolet radiation from a plurality of mercury vapor lamps.

30. The method of claim 28 wherein the electrodeless lamp has at least 8% of its total UV spectral output at wavelengths shorter than 245 nm.

* * * * *